(12) United States Patent
Zhang et al.

(10) Patent No.: US 11,842,306 B2
(45) Date of Patent: Dec. 12, 2023

(54) METHOD AND SYSTEM FOR PREDICTING BUILDING ENERGY CONSUMPTION BASED ON HOLT-WINTERS AND EXTREME LEARNING MACHINE

(71) Applicant: Shandong University, Jinan (CN)

(72) Inventors: Chenghui Zhang, Jinan (CN); Che Liu, Jinan (CN); Bo Sun, Jinan (CN)

(73) Assignee: Shandong University, Jinan (CN)

( * ) Notice: Subject to any disclaimer, the term of this patent is extended or adjusted under 35 U.S.C. 154(b) by 212 days.

(21) Appl. No.: 17/351,098

(22) Filed: Jun. 17, 2021

(65) Prior Publication Data
US 2021/0398048 A1 Dec. 23, 2021

(30) Foreign Application Priority Data
Jun. 19, 2020 (CN) .......................... 202010563062.9

(51) Int. Cl.
*G06Q 10/00* (2023.01)
*G06Q 10/0631* (2023.01)
(Continued)

(52) U.S. Cl.
CPC ......... *G06Q 10/06315* (2013.01); *G06N 7/08* (2013.01); *G06N 20/00* (2019.01); *G06Q 10/04* (2013.01); *G06Q 50/06* (2013.01)

(58) Field of Classification Search
CPC .. G06Q 50/06; G06Q 10/04; G06Q 10/06315; G06N 20/00; G06N 3/08
See application file for complete search history.

(56) References Cited

U.S. PATENT DOCUMENTS

| 2012/0185706 A1* | 7/2012 | Sistla | G06F 1/3206 |
| | | | 713/300 |
| 2014/0122181 A1* | 5/2014 | Fisera | G06Q 30/0202 |
| | | | 705/7.31 |

(Continued)

FOREIGN PATENT DOCUMENTS

| CN | 109543879 A | * | 3/2019 | |
| CN | 110705763 A | * | 1/2020 | ............. G06N 20/20 |
| WO | WO-2018004464 A1 | * | 1/2018 | ............. G05B 13/04 |

OTHER PUBLICATIONS

Xin Huang, "A Load forecasting method and device based on neural network", certified copy of CN-109543879-A, Mar. 29, 2019 (Year: 2019).*

(Continued)

*Primary Examiner* — Brian M Epstein
*Assistant Examiner* — Reham K Abouzahra
(74) *Attorney, Agent, or Firm* — FLENER IP & BUSINESS LAW; Zareefa B. Flener

(57) ABSTRACT

The present disclosure provides a method and system for predicting building energy consumption based on a Holt-Winters and an extreme learning machine, the method including: constructing a building simulation model based on actual operation parameters of a building to obtain an original energy consumption data set of the building; decomposing the original energy consumption data set to obtain a linear energy consumption data set and a nonlinear energy consumption data set; performing prediction on the linear energy consumption data set by using a trained Holt-Winters model to obtain a linear energy consumption prediction result; and inputting the nonlinear energy consumption data set, the original energy consumption data set, and the linear energy consumption prediction result into a trained extreme learning machine model to output a building (Continued)

energy consumption prediction value of the building simulation model.

20 Claims, 1 Drawing Sheet

(51) Int. Cl.
*G06N 20/00* (2019.01)
*G06N 7/08* (2006.01)
*G06Q 10/04* (2023.01)
*G06Q 50/06* (2012.01)

(56) References Cited

U.S. PATENT DOCUMENTS

2015/0355247 A1* 12/2015 Choe .................. G06Q 30/02
  702/60
2018/0356770 A1* 12/2018 ElBsat .................. H02J 3/38
2020/0076196 A1* 3/2020 Lee .................. H02J 3/008

OTHER PUBLICATIONS

Zhang Chenghui, "Ultra-short-term load prediction method and system including error correction", certified copy of CN110705763A, Sep. 23, 2019 (Year: 2019).*

* cited by examiner

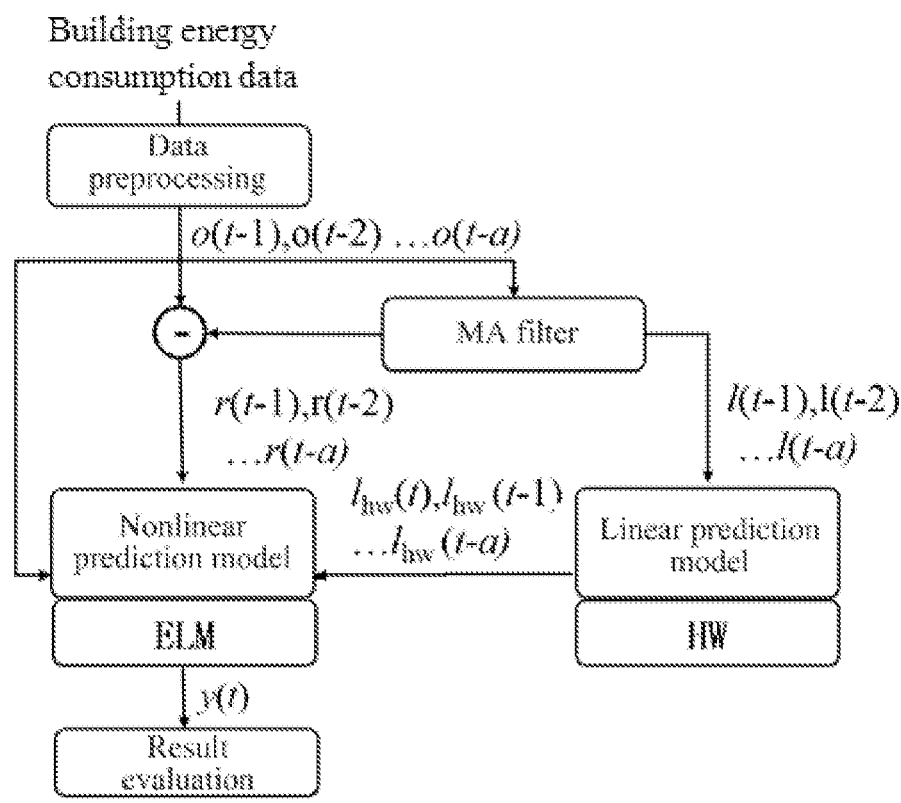

METHOD AND SYSTEM FOR PREDICTING BUILDING ENERGY CONSUMPTION BASED ON HOLT-WINTERS AND EXTREME LEARNING MACHINE

CROSS REFERENCE TO RELATED APPLICATION

This patent application claims the benefit and priority of Chinese Patent Application No. 202010563062.9 filed on Jun. 19, 2020, the disclosure of which is incorporated by reference herein in its entirety as part of the present application.

TECHNICAL FIELD

The present disclosure relates to the technical field of environmental protection and energy, and in particular, to a method and system for predicting building energy consumption based on a Holt-Winters (HW) and an Extreme Learning Machine (ELM).

BACKGROUND ART

The statement of this section is merely intended to provide background information related to the present disclosure, and is not acknowledged as the prior art.

With the development of society, building energy consumption accounts for an increasing proportion of a country's overall energy consumption. Moreover, with the development of distributed energy supply technology and an increasing proportion of new energy in an energy supply system, buildings, as a small complex energy system, have gradually become part of a smart grid. Technologies such as building energy management, household energy management, and building intellectualization can effectively improve energy utilization, but the stable implementations of these technologies need to rely on an accurate building energy consumption prediction.

The method for predicting building energy consumption can be divided into two types of a prediction method based on a physical model and based on a data-driven, according to a model construction mechanism. Physical model-based prediction method is generally constructed by summarizing the impact of external factors on building energy consumption, and have been widely used in building energy simulation tools (such as TRANSYS, EnergyPlus, etc.). However, such prediction model requires huge and complex datasets, including building structures and features, local climate, social activity information, etc., which are sometimes difficult to obtain. In addition, these models cannot deal with complex energy use behavior of users, resulting in large prediction errors, and therefore these models usually cannot accurately predict energy consumption.

Statistical models, such as an autoregressive model, multiple linear regression, HW, ARIMA, Kalman filtering and the like, generally assume that input data can be simplified as a linear function, can consume less time, and can be constructed with a small training set, and therefore the statistical models have been widely used in building energy consumption prediction. However, it is very difficult for these models to deal with nonlinearity of data, and when the user's energy consumption behavior changes suddenly, large prediction errors are caused.

With the improvement of computing capacity of a computer, data-driven based machine learning models are increasingly applied in prediction, such as Artificial Neural Network (ANN), Support Vector Machine (SVR), ELM, and Long Short-Term Memory (LSTM) network etc. The machine learning models exhibit excellent capabilities in predicting nonlinear data sequences, but also require a large amount of training data. Sometimes, it is difficult to obtain enough data from some buildings, and meanwhile, the large amount of training data may also lead to an excessively long training time.

Furthermore, as described in Chinese invention patent No. CN 107704875 A entitled "Building load forecasting method and device based on improved IHCMAC neural network", building load forecasting is realized by using an improved IHCMAC neural network model, and input variables are clustered by a particle swarm-K-means clustering algorithm, so as to obtain model node values to improve the convergence speed of the model. The Chinese invention patent No. CN 104331737 A entitled "Office building load prediction method based on particle swarm neural network" optimizes a neural network with a particle swarm algorithm to construct a building load prediction model. The Chinese invention patent No. CN 103295075 B entitled "Ultra-short-term power load forecasting and early warning method" estimates a data in real time by Kalman filtering and performs load decomposition by wavelet, and then respectively builds a prediction model to implement the load prediction for large enterprises. All of the above carry out building load prediction through a single statistical model or a machine learning model. However, the time series of building energy consumption often feature both linearity and nonlinearity. As a result, a single model often fails to achieve effective prediction effects.

SUMMARY

To solve the foregoing problem, the present disclosure provides a method and system for predicting building energy consumption based on HW and ELM, in which building energy consumption data is decomposed into a stable linear component and a fluctuating nonlinear component based on the coexistence of linearity and nonlinearity of the energy consumption data; and the linear component and the nonlinear component are processed separately by combining the algorithm advantages of the HW and the ELM, thereby improving prediction accuracy.

To achieve the above object, the following technical solutions are employed in the present disclosure.

According to a first aspect, the present disclosure provides a method for predicting building energy consumption based on HW and ELM, including:
  constructing a building simulation model based on actual operation parameters of a building to obtain an original energy consumption data set of the building;
  decomposing the original energy consumption data set to obtain a linear energy consumption data set and a nonlinear energy consumption data set;
  performing prediction on the linear energy consumption data set by using a trained HW model to obtain a linear energy consumption prediction result; and
  inputting the nonlinear energy consumption data set, the original energy consumption data set and the linear energy consumption prediction result into a trained extreme learning machine model to output a building energy consumption prediction value of the building simulation model.

According to a second aspect, the present disclosure provides a system for predicting building energy consumption based on HW and ELM, including:

a data collection module configured to construct a building simulation model based on actual operating parameters of a building to obtain an original energy consumption data set of the building;

a decomposition module configured to decompose the original energy consumption data set to obtain a linear energy consumption data set and a nonlinear energy consumption data set;

a first prediction module configured to perform prediction on the linear energy consumption data set by using a trained HW model to obtain a linear energy consumption prediction result; and a second prediction module configured to input the nonlinear energy consumption data set, the original energy consumption data set, and the linear energy consumption prediction result into a trained extreme learning machine model to output a building energy consumption prediction value of the building simulation model.

According to a third aspect, the present disclosure provides an electronic device, including: a memory, a processor, and computer instructions stored on the memory and executable by the processor, in which when the computer instructions are executed by the processor, the method according to the first aspect is implemented.

According to a fourth aspect, the present disclosure provides a computer-readable storage medium configured to store computer instructions, in which when the computer instructions are executed by a processor, the method according to the first aspect is implemented.

Compared with the prior art, the beneficial effects of the present disclosure are as follows.

The present disclosure changes the traditional idea of using only original data to train a prediction model. According to the present disclosure, building energy consumption data is decomposed into a stable linear component and a fluctuating nonlinear component based on the coexistence of linearity and nonlinearity of the energy consumption data, and by combining the algorithm advantages of HW and an ELM, a linear prediction model is constructed through HW, a nonlinear prediction model is constructed through an ELM, and the linear component and the nonlinear component are processed separately. In this way, the characteristics of building energy consumption data can be taken into account, and the advantages of the two algorithms can be fully leveraged, thereby improving prediction accuracy, effectively reducing the size of the training set, and increasing the training speed. The present disclosure can be applied to a related system of intelligent buildings.

BRIEF DESCRIPTION OF THE DRAWINGS

The accompanying drawings of the specification which constitute a part of the present disclosure provide further understanding of the present disclosure. The schematic embodiments of the present disclosure and description thereof are intended to explain the present disclosure and are not intended to constitute an improper limitation to the present disclosure.

FIG. 1 is a flowchart of a method for predicting building energy consumption based on HW and ELM according to Embodiment 1 of the present disclosure.

DETAILED DESCRIPTION OF THE EMBODIMENTS

The present disclosure will be described in more detail below with reference to the accompanying drawings and embodiments.

It should be noted that the following detailed description is exemplary and is intended to provide further description of the present disclosure. Unless otherwise specified, all technical and scientific terms used herein have the same meanings as those generally understood by those of ordinary skill in the art to which the present disclosure pertains.

It should be noted that the terms used herein are merely used for describing the specific implementations, but are not intended to limit exemplary implementations according to the present disclosure. As used herein, unless the context clearly indicates, otherwise, the singular forms are intended to include the plural forms as well. Moreover, it should be also understood that the terms "include", "have" and any other variants mean to cover a non-exclusive inclusion, for example, a process, method, system, product, or device that includes a list of steps or units is not necessarily limited to those expressly listed steps or units, instead, may include other steps or units not expressly listed or inherent to such a process, method, system, product, or device.

In addition, the embodiments in the present disclosure and the features in the embodiments can be combined with each other in a non-conflicting situation.

Embodiment 1

As shown in FIG. 1, this embodiment provides a method for predicting building energy consumption based on HW and ELM, including the steps of:

S1: constructing a building simulation model based on actual operation parameters of a building to obtain an original energy consumption data set of the building;

S2: decomposing the original energy consumption data set to obtain a linear energy consumption data set and a nonlinear energy consumption data set;

S3: performing prediction on the linear energy consumption data set by using a trained HW model to obtain a linear energy consumption prediction result; and S4: inputting the nonlinear energy consumption data set, the original energy consumption data set, and the linear energy consumption prediction result into a trained ELM model to output a building energy consumption prediction value of the building simulation model.

In the step S1, the actual operation parameters of the building include but are not limited to environmental parameters, distribution of indoor personnel, etc. The environmental parameters include but are not limited to outdoor temperature, outdoor humidity, outdoor wind speed, solar radiation intensity, etc.

In the step S2, the original energy consumption data set is decomposed into a stable linear component and a fluctuating nonlinear component by using a moving average (MA) filter. This step is specifically implemented as follows.

A building energy consumption data set O is expressed in the form of a time series as follows:

$$O=[o(1),o(2),\ldots,o(m+n+h)]$$

where m is the size of a linear prediction training set, m+n is the size of a nonlinear prediction training set, and h is the size of a test set.

In this embodiment, a linear component L is obtained by using the MA filter, and the MA filter generates each point in an output signal by averaging several points in an input signal, as shown in the following formula:

$$l[i]=\frac{1}{M}\sum_{j=0}^{M-1}o[i+j]$$

-continued $$L = [l(1), l(2), \ldots, l(m+n+h)]$$

where M is the number of points for averaging, m is the size of the linear prediction training set, m+n is the size of the nonlinear prediction training set, h is the size of the test set, and L is the linear component.

A nonlinear component R is a difference between O and L:

$$R = O - L$$

$$R = [r(1), r(2), \ldots, r(m+n+h)]$$

where m is the size of the linear prediction training set, m+n is the size of the nonlinear prediction training set, and h is the size of the test set.

In the step S3, the HW model is used to construct a linear prediction model. The HW algorithm has good prediction performance for linear data sequences, and the HW model can obtain an accurate prediction result even with a small training set. During the training of the model, an L-BFGS optimization algorithm is used to optimize the parameter of the HW model with the minimum root-mean-square error of the prediction result used as an objective, to obtain an optimal linear prediction model for predicting the linear component.

In the step S4, the ELM is used to construct a nonlinear model. The ELM model can efficiently process nonlinear time series data. As a single hidden-layer feedforward neural network, the ELM has a good generalization capability, such that internal relationships of known information in a nonlinear system can be effectively mined.

The building energy consumption historical data, the nonlinear component, and the prediction result of the HW are used as inputs to the ELM, to construct a nonlinear prediction model:

$$\begin{cases} O^{tr} = [o^{tr}(1), o^{tr}(2), \ldots, o^{tr}(m+n)] \\ R^{tr} = [r^{tr}(1), r^{tr}(2), \ldots, r^{tr}(m+n)] \\ Y_{hw}^{tr} = [y_{hw}^{tr}(1), y_{hw}^{tr}(2), \ldots, y_{hw}^{tr}(m+n)] \end{cases}$$

$$\begin{cases} S^{tr} = [X^{tr}, Y^{tr}] \\ X^{tr} = [X^{tr}(1), X^{tr}(2), \ldots, X^{tr}(m+n)] \\ X^{tr}(t) = \begin{cases} [o^{tr}(t-1), o^{tr}(t-2), \ldots, o^{tr}(t-a)], \\ [r^{tr}(t-1), r^{tr}(t-2), \ldots, r^{tr}(t-a)], \\ [y_{hw}^{tr}(t), y_{hw}^{tr}(t-1), y_{hw}^{tr}(t-2), \ldots, y_{hw}^{tr}(t-a)] \end{cases} \\ Y^{tr} = [Y^{tr}(1), Y^{tr}(2), \ldots, Y^{tr}(m+n)] \\ Y^{tr}(t) = [o^{tr}(t)] \end{cases}$$

Where $O^{tr}$ is a historical data set for training, $R^{tr}$ is a nonlinear data set for training, $Y_{hw}^{tr}$ is a linear prediction result set for training, m+n is the size of a training set for the nonlinear prediction model, $s^{tr}$ is the training set for the nonlinear prediction model, $x^{tr}$ is an input to the nonlinear prediction model, $y^{tr}$ is an output from the nonlinear prediction model, and a is the number of feedbacks of an input feature of the nonlinear prediction model.

This embodiment uses the HW-ELM hybrid prediction method, which utilizes the respective advantages of the HW and the ELM to perform the prediction separately, thereby improving the prediction accuracy. In addition, characteristics of the energy consumption data itself are fully considered, and the advantages of different algorithms can be fully leveraged, thereby ensuring a highly accurate prediction result with a small amount of training data and training time.

The performance of the prediction model of this embodiment can be evaluated by using a root-mean-square error (RMSE), a mean absolute error (MAE), and a coefficient of determination (R2).

Embodiment 2

According to this embodiment, a system for predicting building energy consumption based on HW and ELM is provided, which may include:

a data collection module configured to construct a building simulation model based on actual operating parameters of a building to obtain an original energy consumption data set of the building;

a decomposition module configured to decompose the original energy consumption data set to obtain a linear energy consumption data set and a nonlinear energy consumption data set;

a first prediction module configured to perform prediction on the linear energy consumption data set by using a trained HW model to obtain a linear energy consumption prediction result; and a second prediction module configured to input the nonlinear energy consumption data set, the original energy consumption data set and the linear energy consumption prediction result into a trained ELM model to output a building energy consumption prediction value of the building simulation model.

It should be noted here that the foregoing modules correspond to steps S1 to S4 in Embodiment 1, and examples and application scenarios implemented by the foregoing modules are the same as those implemented by the corresponding steps, but are not limited to the content disclosed in Embodiment 1. It should be noted that, as part of the system, the above-mentioned modules can be executed in a computer system such as a set of computer-executable instructions.

In more embodiments, the following is further provided.

An electronic device is provided, including: a memory, a processor, and computer instructions stored on the memory and executed by the processor. When the computer instructions are executed by the processor, the method described in Embodiment 1 is implemented. For brevity, details are not repeated herein.

It should be understood that, in the embodiments, the processor may be a central processing unit (CPU), or may be a general-purpose processor, a digital signal processor (DSP), an application-specific integrated circuit (ASIC), a field programmable gate array (FPGA) or another programmable logic device, a discrete gate or a transistor logic device, and a discrete hardware component, among others. The general-purpose processor may be a microprocessor, or the processor may be any conventional processor, etc.

The memory may include a read-only memory and a random access memory, and provide instructions and data to the processor. A part of the memory may further include a non-volatile random access memory. For example, the memory may further store information about the device type.

A computer-readable storage medium is configured to store computer instructions. When the computer instructions are executed by a processor, the method described in Embodiment 1 is implemented.

The method in Embodiment 1 can be directly performed by a hardware processor, or by a combination of hardware in a processor and a software module. The software module may be located in a mature storage medium in the art, such as a random access memory, a flash memory, a read-only memory, a programmable read-only memory, an electrically erasable programmable memory, or a register, etc. The storage medium is located in the memory. The processor reads the information in the memory, and completes the steps of the foregoing method in combination with hardware in the processor. The details are not repeated herein for brevity.

Those of ordinary skill in the art may be aware that, in combination with the examples described in the embodiments, units and algorithm steps may be implemented by using electronic hardware or a combination of computer software and electronic hardware. Whether the functions are performed by hardware or software depends on particular applications and design constraint conditions of the technical solutions. Those skilled in the art may use different methods to implement the described functions for each specific application, but such implementation should not be considered to be beyond the scope of the present application.

The foregoing is merely illustrative of the preferred embodiments of the present disclosure and is not intended to limit the present disclosure, and various changes and modifications may be made to the present disclosure by those skilled in the art. Any modifications, equivalent substitutions, improvements, etc. made within the spirit and scope of the present disclosure should be included within the protection scope of the present disclosure.

Although the specific implementations of the present disclosure have been described above with reference to the accompanying drawings, they do not limit the protection scope of the present disclosure. Those skilled in the art should understand that any modifications or variations made by those skilled in the art without creative efforts still fall within the protection scope of the present disclosure based on the technical solutions of the present disclosure.

What is claimed is:

1. A method for predicting building energy consumption based on a Holt-Winters and an extreme learning machine, comprising:
constructing, by a system for predicting building energy consumption, a building simulation model based on actual operation parameters of a building to obtain an original energy consumption data set of the building, wherein the system comprises a processor and a memory storing a trained Holt-Winters model and a trained extreme learning machine model;
decomposing, by the system, the original energy consumption data set to obtain a linear energy consumption data set and a nonlinear energy consumption data set;
performing prediction on the linear energy consumption data set by using the trained Holt-Winters model in the system to obtain a linear energy consumption prediction result; and
inputting the nonlinear energy consumption data set, the original energy consumption data set, and the linear energy consumption prediction result into the trained extreme learning machine model in the system to output by the system a building energy consumption prediction value of the building simulation model, comprising:
constructing a nonlinear prediction model of the extreme learning machine based on the nonlinear energy consumption data set, the original energy consumption data set, and the linear energy consumption prediction result:

$$\begin{cases} O^{tr} = [o^{tr}(1), o^{tr}(2), \ldots, o^{tr}(m+n)] \\ R^{tr} = [r^{tr}(1), r^{tr}(2), \ldots, r^{tr}(m+n)] \\ Y^{tr}_{hw} = [y^{tr}_{hw}(1), y^{tr}_{hw}(2), \ldots, y^{tr}_{hw}(m+n)] \end{cases}$$

$$\begin{cases} S^{tr} = [X^{tr}, Y^{tr}] \\ X^{tr} = [X^{tr}(1), X^{tr}(2), \ldots, X^{tr}(m+n)] \\ X^{tr}(t) = \begin{cases} [o^{tr}(t-1), o^{tr}(t-2), \ldots, o^{tr}(t-a)], \\ [r^{tr}(t-1), r^{tr}(t-2), \ldots, r^{tr}(t-a)], \\ [y^{tr}_{hw}(t), y^{tr}_{hw}(t-1), y^{tr}_{hw}(t-2), \ldots, y^{tr}_{hw}(t-a)] \end{cases} \\ Y^{tr} = [Y^{tr}(1), Y^{tr}(2), \ldots, Y^{tr}(m+n)] \\ Y^{tr}(t) = [o^{tr}(t)] \end{cases}$$

wherein $O^{tr}$ is a historical data set for training, $R^{tr}$ is a nonlinear data set for training, $y_{hw}^{tr}$ is a linear prediction result set for training, m+n is a size of a training set for the nonlinear prediction model, $S^{tr}$ is the training set for the nonlinear prediction model, $X^{tr}$ is an input to the nonlinear prediction model, $Y^{tr}$ is an output from the nonlinear prediction model, and a is a number of feedbacks of an input feature of the nonlinear prediction model, and m is a size of the linear prediction training set.

2. The method for predicting building energy consumption based on Holt-Winters and extreme learning machine according to claim 1, wherein the original energy consumption data set is decomposed into a stable linear energy consumption data set and a fluctuating nonlinear energy consumption data set by using a moving average filter in the system.

3. The method for predicting building energy consumption based on Holt-Winters and extreme learning machine according to claim 2, wherein the original energy consumption data set is represented by a time series, the moving average filter averages several sequence points in the time series of the original energy consumption data set, and all average sequence points obtained constitute the linear energy consumption data set.

4. The method for predicting building energy consumption based on Holt-Winters and extreme learning machine according to claim 3, wherein the nonlinear energy consumption data set is obtained by subtracting the linear energy consumption data set from the original energy consumption data set.

5. The method for predicting building energy consumption based on Holt-Winters and extreme learning machine according to claim 1, wherein during training of the Holt-Winters model, a Limited-Broyden-Fletcher-Goldfarb-Shanno (L-BFGS) algorithm is used to solve for an optimal parameter of the Holt-Winters model with a minimum root-mean-square error of the prediction result used as an objective.

6. The method for predicting building energy consumption based on Holt-Winters and extreme learning machine according to claim 1, wherein the extreme learning machine model is trained by using a training set constructed by the linear energy consumption data set, the original energy consumption data set and the linear energy consumption prediction result.

7. The method for predicting building energy consumption based on Holt-Winters and extreme learning machine according to claim 1, wherein the actual operation parameters of the building comprise but are environmental parameters and distribution of indoor personnel, the environmental parameters comprising outdoor temperature, outdoor humidity, outdoor wind speed, and solar radiation intensity.

8. A non-transitory computer-readable storage medium configured to store computer instructions, wherein when the computer instructions are executed by a processor, the method according to claim 1 is implemented.

9. The method for predicting building energy consumption based on Holt-Winters and extreme learning machine according to claim 1, wherein the building energy consumption prediction value of the building simulation model is input from the system to a building energy management platform for adjusting energy of the building according to the building energy consumption prediction value.

10. A system for predicting building energy consumption based on Holt-Winters and extreme learning machine, comprising a processor and a memory storing program codes comprising a trained Holt-Winters model and a trained extreme learning machine model, wherein the processor performs the stored program codes for:

constructing a building simulation model based on actual operating parameters of a building to obtain an original energy consumption data set of the building;

decomposing the original energy consumption data set to obtain a linear energy consumption data set and a nonlinear energy consumption data set;

performing prediction on the linear energy consumption data set by using the trained Holt-Winters model to obtain a linear energy consumption prediction result; and inputting the nonlinear energy consumption data set, the original energy consumption data set, and the linear energy consumption prediction result into the trained extreme learning machine model to output a building energy consumption prediction value of the building simulation model, comprising:

constructing a nonlinear prediction model of the extreme learning machine based on the nonlinear energy consumption data set, the original energy consumption data set, and the linear energy consumption prediction result:

$$\begin{cases} O^{tr} = [o^{tr}(1), o^{tr}(2), \ldots, o^{tr}(m+n)] \\ R^{tr} = [r^{tr}(1), r^{tr}(2), \ldots, r^{tr}(m+n)] \\ Y_{hw}^{tr} = [y_{hw}^{tr}(1), y_{hw}^{tr}(2), \ldots, y_{hw}^{tr}(m+n)] \end{cases}$$

$$\begin{cases} S^{tr} = [X^{tr}, Y^{tr}] \\ X^{tr} = [X^{tr}(1), X^{tr}(2), \ldots, X^{tr}(m+n)] \\ X^{tr}(t) = \begin{cases} [o^{tr}(t-1), o^{tr}(t-2), \ldots, o^{tr}(t-a)], \\ [r^{tr}(t-1), r^{tr}(t-2), \ldots, r^{tr}(t-a)], \\ [y_{hw}^{tr}(t), y_{hw}^{tr}(t-1), y_{hw}^{tr}(t-2), \ldots, y_{hw}^{tr}(t-a)] \end{cases} \\ Y^{tr} = [Y^{tr}(1), Y^{tr}(2), \ldots, Y^{tr}(m+n)] \\ Y^{tr}(t) = [o^{tr}(t)] \end{cases}$$

wherein $O^{tr}$ is a historical data set for training, $R^{tr}$ is a nonlinear data set for training, $v_{hw}^{tr}$ is a linear prediction result set for training, m+n is a size of a training set for the nonlinear prediction model, $S^{tr}$ is the training set for the nonlinear prediction model, $X^{tr}$ is an input to the nonlinear prediction model, $Y^{tr}$ is an output from the nonlinear prediction model, and a is a number of feedbacks of an input feature of the nonlinear prediction model, and m is a size of the linear prediction training set.

11. The system for predicting building energy consumption based on Holt-Winters and extreme learning machine according to claim 10, wherein the original energy consumption data is decomposed into a stable linear energy consumption data set and a fluctuating nonlinear energy consumption data set by using a moving average filter.

12. The system for predicting building energy consumption based on Holt-Winters and extreme learning machine according to claim 11, wherein the original energy consumption data set is represented by a time series, the moving average filter averages several sequence points in the time series of the original energy consumption data set, and all average sequence points obtained constitute the linear energy consumption data set.

13. The system for predicting building energy consumption based on Holt-Winters and extreme learning machine according to claim 12, wherein the nonlinear energy consumption data set is obtained by subtracting the linear energy consumption data set from the original energy consumption data set.

14. The system for predicting building energy consumption based on Holt-Winters and extreme learning machine according to claim 10, wherein during training of the Holt-Winters model, a Limited-Broyden-Fletcher-Goldfarb-Shanno (L-BFGS) algorithm is used to solve for an optimal parameter of the Holt-Winters model with a minimum root-mean-square error of the prediction result used as an objective.

15. An electronic device, comprising: a memory, a processor, and computer instructions stored on the memory and executable by the processor, wherein when the computer instructions are executed by the processor, a method for predicting building energy consumption based on Holt-Winters and extreme learning machine is implemented, the method comprising:

constructing a building simulation model based on actual operation parameters of a building to obtain an original energy consumption data set of the building;

decomposing the original energy consumption data set to obtain a linear energy consumption data set and a nonlinear energy consumption data set;

performing prediction on the linear energy consumption data set by using a trained Holt-Winters model to obtain a linear energy consumption prediction result; and inputting the nonlinear energy consumption data set, the original energy consumption data set, and the linear energy consumption prediction result into a trained extreme learning machine model to output a building energy consumption prediction value of the building simulation model, comprising:

constructing a nonlinear prediction model of the extreme learning machine based on the nonlinear energy consumption data set, the original energy consumption data set, and the linear energy consumption prediction result:

$$\begin{cases} O^{tr} = [o^{tr}(1), o^{tr}(2), \ldots, o^{tr}(m+n)] \\ R^{tr} = [r^{tr}(1), r^{tr}(2), \ldots, r^{tr}(m+n)] \\ Y_{hw}^{tr} = [y_{hw}^{tr}(1), y_{hw}^{tr}(2), \ldots, y_{hw}^{tr}(m+n)] \end{cases}$$

$$\begin{cases} S^{tr} = [X^{tr}, Y^{tr}] \\ X^{tr} = [X^{tr}(1), X^{tr}(2), \ldots, X^{tr}(m+n)] \\ X^{tr}(t) = \begin{cases} [o^{tr}(t-1), o^{tr}(t-2), \ldots, o^{tr}(t-a)], \\ [r^{tr}(t-1), r^{tr}(t-2), \ldots, r^{tr}(t-a)], \\ [y_{hw}^{tr}(t), y_{hw}^{tr}(t-1), y_{hw}^{tr}(t-2), \ldots, y_{hw}^{tr}(t-a)] \end{cases} \\ Y^{tr} = [Y^{tr}(1), Y^{tr}(2), \ldots, Y^{tr}(m+n)] \\ Y^{tr}(t) = [o^{tr}(t)] \end{cases}$$

wherein $O^{tr}$ is a historical data set for training, $R^{tr}$ is a nonlinear data set for training, $v_{hw}^{tr}$ is a linear prediction result set for training, m+n is a size of a training set for the nonlinear prediction model, $S^{tr}$ is the training set for the nonlinear prediction model, $X^{tr}$ is an input to the nonlinear prediction model, $Y^{tr}$ is an output from the nonlinear prediction model, and a is a number of feedbacks of an input feature of the nonlinear prediction model, and m is a size of the linear prediction training set.

16. The electronic device according to claim 15, wherein the original energy consumption data is decomposed into a stable linear energy consumption data set and a fluctuating nonlinear energy consumption data set by using a moving average filter.

17. The electronic device according to claim 16, wherein the original energy consumption data set is represented by a time series, the moving average filter averages several sequence points in the time series of the original energy consumption data set, and all average sequence points obtained constitute the linear energy consumption data set.

18. The electronic device according to claim 17, wherein the nonlinear energy consumption data set is obtained by subtracting the linear energy consumption data set from the original energy consumption data set.

19. The electronic device according to claim 15, wherein during training of the Holt-Winters model, an L BFGS method a Limited-Broyden-Fletcher-Goldfarb-Shanno (L-BFGS) algorithm is used to solve for an optimal parameter of the Holt-Winters model with a minimum root-mean-square error of the prediction result used as an objective.

20. The electronic device according to claim 15, wherein the extreme learning machine model is trained by using a training set constructed by the linear energy consumption data set, the original energy consumption data set and the linear energy consumption prediction result.

* * * * *